(12) United States Patent
Mitchell et al.

(10) Patent No.: US 8,344,586 B2
(45) Date of Patent: Jan. 1, 2013

(54) TEMPERATURE-ACTIVATED VOLTAGE GENERATOR

(75) Inventors: Bradley J. Mitchell, Snohomish, WA (US); Gerardo Pena, Seattle, WA (US); Matthew C. Malkin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/529,071

(22) Filed: Jun. 21, 2012

(65) Prior Publication Data

US 2012/0256427 A1    Oct. 11, 2012

Related U.S. Application Data

(62) Division of application No. 12/020,783, filed on Jan. 28, 2008, now Pat. No. 8,227,955.

(51) Int. Cl.
*H02N 10/00* (2006.01)

(52) U.S. Cl. ......... 310/307; 310/328; 310/334; 310/339

(58) Field of Classification Search ................ 310/307, 310/328, 334, 339, 346
See application file for complete search history.

(56) References Cited

U.S. PATENT DOCUMENTS

| | | | |
|---|---|---|---|
| 3,916,348 A | 10/1975 | Toda et al. | |
| 4,256,991 A * | 3/1981 | Otala | 315/104 |
| 5,781,104 A * | 7/1998 | Huang | 340/442 |
| 5,849,125 A * | 12/1998 | Clark | 156/222 |
| 6,060,811 A * | 5/2000 | Fox et al. | 310/311 |
| 6,522,048 B1 * | 2/2003 | Burns et al. | 310/316.01 |
| 7,258,533 B2 | 8/2007 | Tanner et al. | |
| 7,808,158 B1 * | 10/2010 | Deeds et al. | 310/339 |
| 2006/0017353 A1 | 1/2006 | Sakai | |

OTHER PUBLICATIONS

US Patent and Trademark Office, Office Action for U.S. Appl. No. 12/020,783 dated Oct. 20, 2011.

* cited by examiner

*Primary Examiner* — Walter Benson
*Assistant Examiner* — Bryan Gordon
(74) *Attorney, Agent, or Firm* — Parsons Behle & Latimer

(57) ABSTRACT

An illustrative embodiment of a temperature-activated voltage generator includes a generator housing having a housing interior; a flexible, temperature-sensitive bimetallic element disposed in the housing interior; and a piezoelectric element carried by the generator housing. The bimetallic element is positional between a first position wherein the bimetallic element disengages the piezoelectric element and a second position wherein the bimetallic element engages the piezoelectric element. Electrical voltage output leads are electrically connected to the piezoelectric element. A voltage-generating method is also disclosed.

14 Claims, 2 Drawing Sheets

TEMPERATURE-ACTIVATED VOLTAGE GENERATOR

This application is a divisional of U.S. patent application Ser. No. 12/020,783, filed Jan. 28, 2008 now U.S. Pat. No. 8,227,955, and entitled "Temperature-Activated Voltage Generator," the disclosure of which is hereby incorporated by reference in its entirety.

TECHNICAL FIELD

The disclosure relates to thermal energy harvesting devices. More particularly, the disclosure relates to a temperature-activated voltage generator which is capable of generating an electrical pulse to activate thermal energy harvesting device.

BACKGROUND

Low-power circuitry in thermal energy harvesting devices may require an electrical pulse for activation. In order to make the energy harvesting device maintenance-free and wireless, power wires or replaceable batteries may not be included in the system design. Furthermore, batteries discharge over time and may require replacement. Therefore, a mechanism to generate an electrical pulse at a specified temperature without wires or batteries may be desirable.

SUMMARY

The disclosure is generally directed to temperature-activated voltage generator. An illustrative embodiment of the temperature-activated voltage generator includes a generator housing having a housing interior; a flexible, temperature-sensitive bimetallic element disposed in the housing interior; and a piezoelectric element carried by the generator housing. The bimetallic element is positional between a first position wherein the bimetallic element disengages the piezoelectric element and a second position wherein the bimetallic element engages the piezoelectric element. Electrical voltage output leads are electrically connected to the piezoelectric element. A voltage-generating method is also disclosed.

Another illustrative embodiment the temperature-activated voltage generator includes a generator housing having a housing interior; a flexible, temperature-sensitive bimetallic element disposed in the housing interior; and a piezoelectric element carried by the bimetallic element. The bimetallic element is positional between a first position wherein the piezoelectric element disengages the generator housing and a second position wherein the piezoelectric element engages the generator housing. Electrical voltage output leads are electrically connected to the bimetallic element and the piezoelectric element.

The disclosure is generally further directed to a voltage-generating method. An illustrative embodiment of the method includes providing a piezoelectric element, placing a temperature-sensitive bimetallic element in a first position with respect to the piezoelectric element, generating a voltage pulse by placing the temperature-sensitive bimetallic element in a second position in contact with the piezoelectric element by inducing temperature changes in the bimetallic element, and capturing the voltage pulse.

BRIEF DESCRIPTION OF THE ILLUSTRATIONS

DETAILED DESCRIPTION

Figure 1:
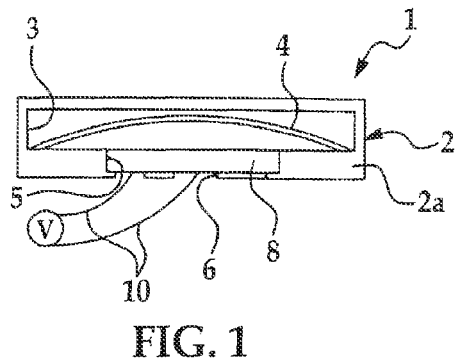
FIG. 1 is a cross-sectional view of an illustrative embodiment the temperature-activated voltage generator, with a bimetallic element of the generator shown in a stable or unsnapped position.
Figure 2:
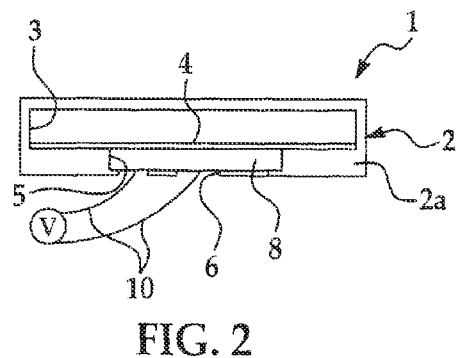
FIG. 2 is a cross-sectional view of an illustrative embodiment of the temperature-activated voltage generator, with the bimetallic element of the generator shown in a snapped or voltage-generating position against a piezoelectric element.

Referring initially to FIGS. 1 and 2, an illustrative embodiment of the temperature-activated voltage generator is generally indicated by reference numeral 1. The temperature-activated voltage generator 1 may include a generator housing 2. The generator housing 2 may have a housing wall 2a which may have a generally cylindrical shape. The generator housing 2 may have a housing interior 3. A flexible, temperature-sensitive bimetallic element 4 may be disposed in the housing interior 3 of the generator housing 2. The bimetallic element 4 may be a Belleville disc, ring or dome, for example and without limitation. The ends or perimeter of the bimetallic element 4 may be fixed inside the housing interior 3 according to the knowledge of those skilled in the art, whereas the middle portion of the bimetallic element 4 may be free to move between a stable or un-snapped position and a snapped or voltage-generating position in the housing interior 3 as will be hereinafter described.

A piezoelectric element 8 may be provided in the housing wall 2a of the generator housing 2, generally adjacent to the bimetallic element 4. The piezoelectric element 8 may include a single piece of electroded piezoelectric material. Alternatively, the piezoelectric element 8 may include a stack of piezoelectric materials. The piezoelectric element 8 may be seated in a piezoelectric element opening 5 provided in the generator housing 2. As shown in FIG. 1, the bimetallic element 4 may be positional in a stable or un-snapped position (FIG. 1) or an alternative, snapped or voltage-generating position (FIG. 2). The bimetallic element 4 may be adapted to undergo differential thermal contraction in which the bimetallic element 4 transitions from the stable or un-snapped position shown in FIG. 1 to the snapped or voltage-generating position shown in FIG. 2 as a result of a decrease in ambient temperature. In the snapped or voltage-generating position shown in FIG. 2, the bimetallic element 4 may strike or engage the piezoelectric element 8 and thereby generate a momentary voltage pulse. Accordingly, electrical output voltage leads 10 may be electrically connected to the piezoelectric element 8 to capture the momentary voltage pulse which is generated by striking or contact of the bimetallic element 4 with the piezoelectric element 8. The electrical voltage output leads 10 may extend through lead openings 6 which are provided in the housing wall 2a and through which the piezoelectric element 8 is exposed.

In one exemplary application, the temperature-activated voltage generator 1 may be installed in an aircraft (not shown). The electrical voltage output leads 10 may be electrically connected to a low-power electronic circuit such as, for example and without limitation, a thermal energy harvesting device (not shown) which is adapted to generate electrical energy based on thermal gradients in the aircraft. The bimetallic element 4 may initially be disposed in the stable or un-snapped position in the housing interior 3 of the generator housing 2, as shown in FIG. 1. As the ambient temperature around the temperature-activated voltage generator 1 decreases upon ascent of the aircraft into the atmosphere, differential thermal contraction in the bimetallic element 4 may cause the bimetallic element 4 to flatten. Consequently, the bimetallic element 4 may transition from the stable or un-snapped position shown in FIG. 1 to the snapped or voltage-generating position shown in FIG. 2, thereby striking or engaging the piezoelectric element 8. The resulting contact of the bimetallic element 4 with the piezoelectric element 8 may generate a momentary voltage pulse which may be transmitted by the electrical voltage output leads 10 to the thermal energy harvesting device (not shown). The momentary voltage pulse may induce the thermal energy harvesting device to generate electrical current based on thermal gradients in the thermal energy harvesting device or power some other low-power electronic circuit (not shown) to which the electrical voltage output leads are connected.

Figure 3:
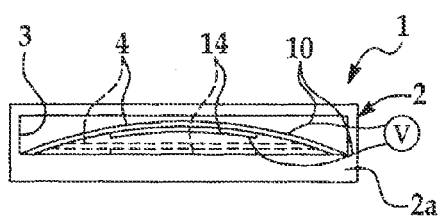
FIG. 3 is a cross-sectional view of an alternative illustrative embodiment of the temperature-activated voltage generator, with a bimetallic element of the generator shown in a stable or unsnapped position (solid lines) and in a snapped or voltage-generating position (phantom lines).

Referring next to FIG. 3, in an alternative illustrative embodiment of the temperature-activated voltage generator 1a, a piezoelectric strip or element 14 may be provided on the bimetallic element 4. The piezoelectric element 14 may include a single piece of electroded piezoelectric material. Alternatively, the piezoelectric element 14 may include a stack of piezoelectric materials. The electrical voltage output leads 10 may be electrically connected to the bimetallic element 4 and the piezoelectric element 14, respectively. As indicated by the solid lines in FIG. 3, when the bimetallic element 4 is disposed in the stable or un-snapped position, the piezoelectric element 14 disengages the housing wall 2a of the generator housing 2. When the bimetallic element 4 is disposed in the snapped or voltage-generating position, the piezoelectric element 14 strikes or engages the housing wall 2. The resulting striking of the piezoelectric element 14 against the bimetallic element may generate a momentary voltage pulse which may be transmitted by the electrical voltage output leads 10 and used to power a thermal energy harvesting device (not shown) or other low-power electronic circuit.

Figure 4:
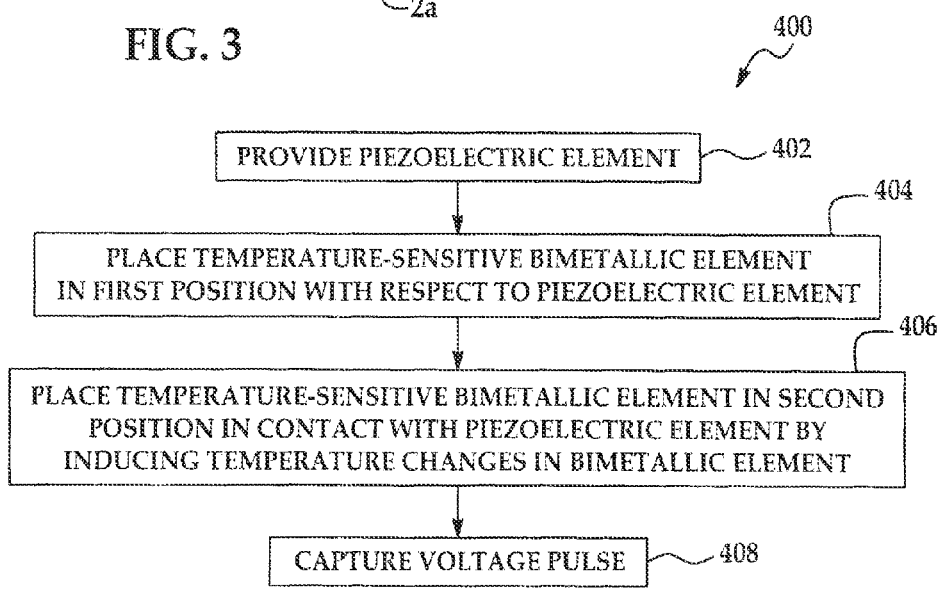
FIG. 4 is a flow diagram which illustrates an illustrative embodiment of a voltage-generating method.

Referring next to FIG. 4, a flow diagram 400 which illustrates an illustrative embodiment of a voltage-generating method is shown. In block 402, a piezoelectric element may be provided. In block 404, a temperature-sensitive bimetallic element may be placed in a first position with respect to the piezoelectric element. In block 406, the temperature-sensitive bimetallic element may be placed in a second position in contact with the piezoelectric element by inducing temperature changes in the bimetallic element. In block 408, a momentary voltage pulse which is generated by contact of the temperature-sensitive bimetallic element with the piezoelectric element may be captured.

Figure 5:
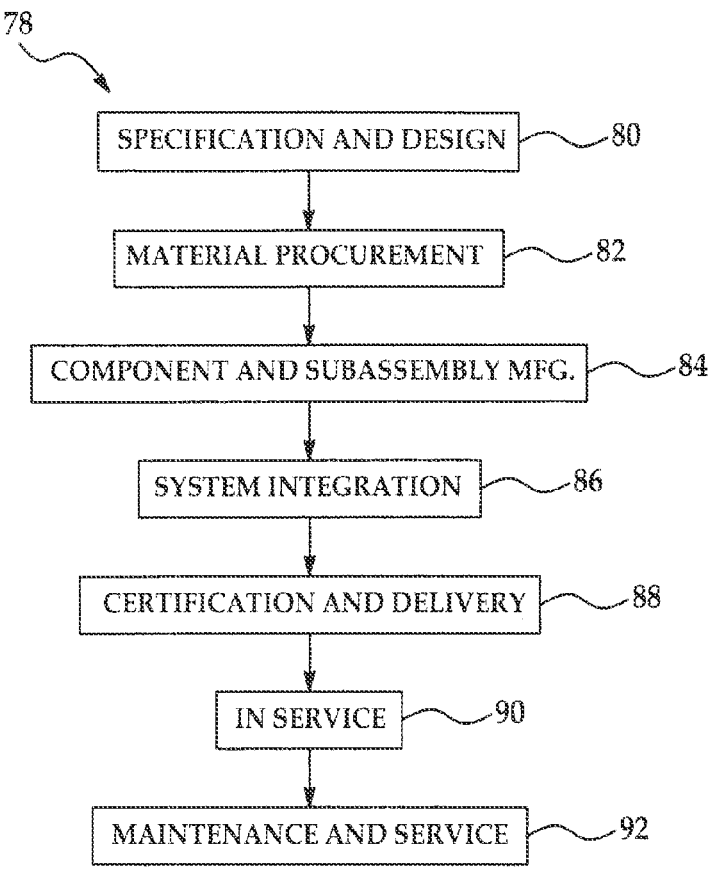
FIG. 5 is a flow diagram of an aircraft production and service methodology.
Figure 6:
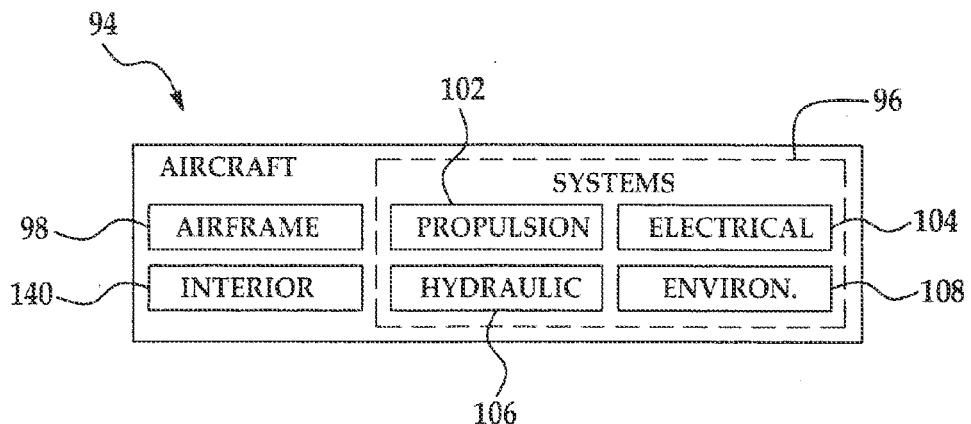
FIG. 6 is a block diagram of an aircraft.

Referring next to FIGS. 5 and 6, embodiments of the disclosure may be used in the context of an aircraft manufacturing and service method 78 as shown in FIG. 5 and an aircraft 94 as shown in FIG. 6. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A temperature-activated voltage generator, comprising:
 a generator housing having a housing interior;
 a flexible, temperature-sensitive bimetallic element disposed in said housing interior;
 a piezoelectric element carried by said bimetallic element;
 said bimetallic element is positional between a first position wherein said piezoelectric element disengages said generator housing in response to a first higher temperature, and a second position wherein said piezoelectric element engages said generator housing in response to a second lower temperature; and
 electrical voltage output leads electrically connected to said bimetallic element and said piezoelectric element.

2. The temperature-activated voltage generator of claim 1 wherein said generator housing is generally cylindrical.

3. The temperature-activated voltage generator of claim 1 wherein said bimetallic element comprises a Belleville disc.

4. The temperature-activated voltage generator of claim 1 wherein said bimetallic element comprises a Belleville ring.

5. The temperature-activated voltage generator of claim 1 wherein said generator housing comprises a housing wall and said piezoelectric element engages said housing wall in said second position of said bimetallic element.

6. The temperature-activated voltage generator of claim 1 wherein said piezoelectric element comprises a single piece of piezoelectric material having an electrode.

7. The temperature-activated voltage generator of claim 1 wherein said piezoelectric element comprises a stack of piezoelectric materials.

8. A method for generating a voltage, comprising:

providing a piezoelectric element disposed on a flexible, temperature-sensitive bimetallic element, within a generator housing;

placing the bimetallic element in a first position in which the piezoelectric element does not engage the generator housing;

inducing a downward temperature change in the bimetallic element, thereby causing the bimetallic element to move to a second position in which the piezoelectric element engages the generator housing and generates a voltage pulse; and capturing the voltage pulse.

9. The method of claim 8, wherein providing the temperature-sensitive bimetallic element comprises providing a Belleville disc.

10. The method of claim 8, wherein providing a temperature-sensitive bimetallic element comprises providing a Belleville ring.

11. The method of claim 8, wherein causing the piezoelectric element to engage the generator housing comprises causing the piezoelectric element to engage a housing wall of the generator housing.

12. The method of claim 8, wherein providing the piezoelectric element carried by the flexible, temperature-sensitive bimetallic element comprises providing a single piece of piezoelectric material having an electrode, upon the bimetallic element.

13. The method of claim 8, wherein providing the piezoelectric element carried by the flexible, temperature-sensitive bimetallic element comprises providing a stack of piezoelectric materials upon the bimetallic element.

14. The method of claim 8, wherein providing the piezoelectric element carried by the flexible, temperature-sensitive bimetallic element, within the generator housing further comprises providing a generally cylindrical generator housing.

\* \* \* \* \*